(12) United States Patent
Martinez Acedo et al.

(10) Patent No.: US 6,697,482 B1
(45) Date of Patent: Feb. 24, 2004

(54) METHOD AND SYSTEM FOR TRANSMITTING MESSAGES TO SUBSCRIBERS DURING THE SET-UP STAGE OF INCOMING TELEPHONE CALLS

(75) Inventors: Jose Luis Martinez Acedo, Madrid (ES); Juan Carlos De Las Heras Diez, Madrid (ES)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/443,466

(22) Filed: Nov. 19, 1999

(30) Foreign Application Priority Data

Nov. 26, 1998 (ES) .............................. 9802486

(51) Int. Cl.[7] .......................... H04M 3/00; H04M 7/00
(52) U.S. Cl. ................ 379/334; 379/142.13; 379/251; 379/373.03
(58) Field of Search .................... 379/88.18–88.21, 379/93.01, 93.05–93.07, 93.09, 93.14, 93.15, 93.17, 93.23, 93.26–93.28, 93.31, 93.32, 142.01, 142.04, 142.06, 142.07, 142.13, 142.14, 142.15, 242, 243, 251, 252, 253, 257, 333–339, 345, 350, 372–374.02, 376.02, 177, 179, 187

(56) References Cited

U.S. PATENT DOCUMENTS

| | | | | |
|---|---|---|---|---|
| 4,551,581 A | * | 11/1985 | Doughty ................ 379/142.01 |
| 5,222,130 A | * | 6/1993 | Pflueger et al. ............. 379/219 |
| 5,263,081 A | * | 11/1993 | Nightingale et al. ........ 379/236 |
| 5,396,548 A | * | 3/1995 | Bayerl et al. ................ 379/140 |
| 5,467,385 A | * | 11/1995 | Reuben et al. ......... 379/142.13 |
| 5,479,493 A | * | 12/1995 | Baker et al. ........... 379/127.01 |
| 5,559,860 A | * | 9/1996 | Mizikovsky ................. 340/7.1 |
| 5,566,239 A | * | 10/1996 | Garcia et al. ................ 379/219 |
| 5,581,599 A | * | 12/1996 | Tsuji et al. ................... 455/415 |
| 5,737,400 A | * | 4/1998 | Bagchi et al. .......... 379/142.01 |
| 6,141,330 A | * | 10/2000 | Akers ........................ 370/264 |
| 6,208,670 B1 | * | 3/2001 | Milliron et al. .............. 370/540 |
| 6,219,409 B1 | * | 4/2001 | Smith et al. ........... 379/106.03 |
| 6,289,097 B1 | * | 9/2001 | Gregory et al. ............. 370/352 |
| 6,442,256 B1 | * | 8/2002 | Garland et al. ......... 379/106.09 |
| 6,442,264 B1 | * | 8/2002 | Sutter .................... 379/142.07 |

* cited by examiner

Primary Examiner—Roland G. Foster
(74) Attorney, Agent, or Firm—Sughrue Mion, PLLC

(57) ABSTRACT

Method and system for transmitting messages to subscribers of a telephone network during the set-up stage of incoming calls prior to the off-hook from a local exchange to at least one telephone terminal through an access system. The access system simulates, on one hand, the operation of a telephone terminal towards the local switching exchange such that it receives, from the local switching exchange and by means of an access node located in the access system, a first message preferably modulated and demodulates and stores it for subsequent replication; and, on the other hand, simulates the operation of a local switching exchange towards the telephone terminal such that it generates and transmits to the telephone terminal and by means of a network termination located in the access system, a second message preferably modulated which is a replication of the first message.

13 Claims, 5 Drawing Sheets

Fig. 4 — Audio / Signalling

Fig. 5 — Audio / Signalling

METHOD AND SYSTEM FOR TRANSMITTING MESSAGES TO SUBSCRIBERS DURING THE SET-UP STAGE OF INCOMING TELEPHONE CALLS

The present invention relates to a method and a system for transmitting messages to subscribers during the set-up stage of incoming calls and, particularly, to subscribers to an access system connected to a local switching exchange by means of two-wire telephone interfaces.

BACKGROUND OF THE INVENTION

The transmission of messages prior to the off-hook of the telephone handset in an incoming call, known as "ON-HOOK DATA TRANSMISSION", i.e. transmission of data while the telephone handset is on-hook and before starting the sending of the ringing current, is specified in the ETSI (European Telecommunications Standards Institute) standard ETS 300 659-1. Said standard defines the procedure to be followed by both the local switching exchange and the subscriber telephone terminal in order that the messages transmitted (calling subscriber identity, date, time, etc.) be displayed to the called subscriber while the telephone is ringing.

Said procedure defines several stages, starting with the sending from the local exchange of a warning indication to the telephone terminal, followed by the transmission of the message to be sent, previously modulated into the audio band, and followed finally by the ringing tone which causes the telephone terminal ringer to start ringing.

The stages mentioned above have a predetermined duration, and the interval of time that elapses between each of the stages is also specified. When the connection of the telephone terminal is made directly to the local switching exchange over the two-wire telephone line, and whenever the local switching exchange and the subscriber telephone terminal can support the message display service in accordance with the aforementioned ETSI standard, there is no problem in running the procedure. Exceptionally, errors can arise in the message as a consequence of noise being induced in the telephone line, but in any event this effect shall occur on very few occasions, sufficiently low to be considered as negligible.

Nevertheless, when the connection between the local switching exchange and the subscriber telephone terminal is set up through an access system the resources of which are shared by all the subscribers to said access network, it can occur that even though the local switching exchange and the subscriber telephone terminal comply with the ETSI standard ETS 300 659-1, it is not possible to guarantee the correct operation of the message display service due to the delays that could arise in the call set-up stage.

In addition, when the connection between the access system and the switching exchange is made over 2 Mbit/s links, with or without concentration (for example, V5.1 or V5.2), the switching exchange employs a procedure in which one stage of the procedure is not initiated before acknowledgement has been received from the access system with respect to the preceding stage.

An access system typically consists of a central access node, which makes the connection with the local switching exchange, and a set of network terminations, to which the telephone terminals of the end user are connected.

The central access node serves to allocate the access system resources (traffic channels) which are shared among all system users. Said allocation of resources is achieved by means of signalling messages generated as a result of detecting incoming calls (to system subscribers) or outgoing calls (from system subscribers). A dialogue is therefore set up between the access system elements (central access node and network terminations) in which agreement is reached on the resources which are to be employed from among those presently available to all the subscribers connected to the access system (shared resources) and which will serve as support for the call being set up.

To perform all the system management functions, the central access node is formed by a set of units with the following associated functionalities.

interface with the local switching exchange;
system resources management;
interface with the network terminations;
supervision of system elements.

For their part the network terminations serve to handle the calls from or to the telephone terminals that are connected to them, replicating the operation of the local switching exchange. For this reason, the network terminations are formed by a set of units with the following functionalities.

interface with the telephone terminal;
interface with the central access node;
telephone signal processing;
alarm transmission to central access node.

When the local switching exchange supports the on-hook data transmission service, the telephone terminal connected to the access system network termination has to permit the displaying of said messages sent during the call announcement stage.

Figure 1:
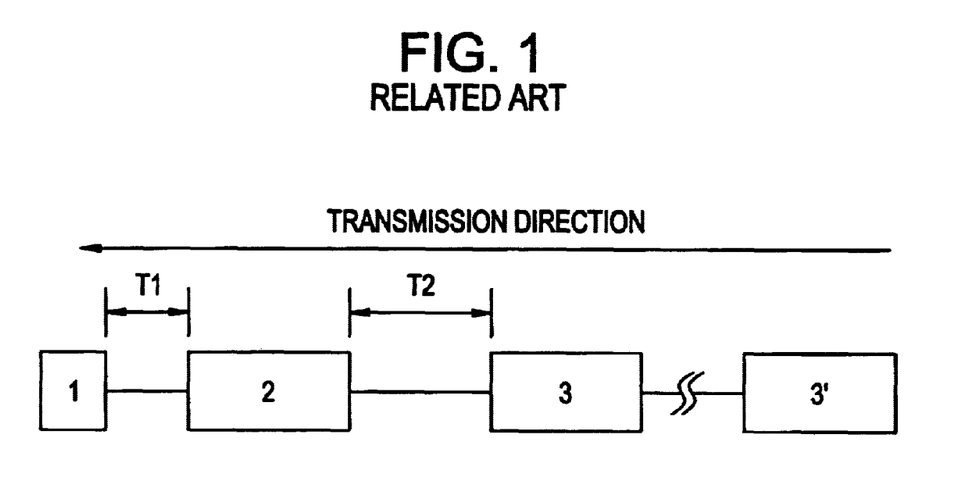
FIG. 1 shows a sequence of events for on-hook data transmission according to the procedure defined in the ETSI standard ETS 300 659-1 that belongs to the state of the art.

The sequence of events transmitted by the local switching exchange to the telephone terminal with the telephone handset on-hook, is to be found illustrated in FIG. 1 and is defined in the ETSI standard ETS 300 659-1.

As can be seen from FIG. 1, the alert signal (1) is first transmitted by the local switching exchange for the purpose of notify the telephone terminal of the imminent transmission of a modulated message (2). Said alert signal (1) causes the telephone terminal to connect the circuits required for extracting the information sent by the local switching exchange.

In order to permit the telephone terminal to detect the presence of the alert signal and connect its circuits for receiving modulated messages, there is a guard time (T1) between the end of the alert signal and the start of the modulated message (2). On conclusion of this guard time the local switching exchange will send the modulated message (2) in the audio frequency band.

In the same manner as the switching exchange includes a guard time between the alert signal (1) and the modulated message (2), it also has a guard time (T2) between the end of the modulated message (2) and the first pulse of ringing tone (3) in order for the telephone terminal to detect the end of the message and proceed to disconnect the modulated message detection circuitry. Moreover, due to the characteristics of the ringing tone pulses, and particularly their relatively high voltage, it is necessary to ensure that the demodulator is disconnected when the first ringing tone arrives, otherwise said circuit could suffer damage. From the first ringing tone pulse, successive ringing tone pulses (3') are applied until the destination user off-hooks his handset.

When there is an access system with shared resources situated between the local switching exchange and the telephone terminal, said guard times and events sequence may be systematically altered either through delays in setting up traffic channels for transporting the modulated message, with the possibility of truncating or even impeding message transmission over the access system, or through lack of synchronisation between the local switching exchange events and events replicated into the telephone terminal, leading to disrespect of guard times and consequently endangering the telephone terminal circuitry.

It is therefore necessary to respect the sequence of events and the time intervals between these whenever an access-system is being used between the local switching exchange and the telephone terminal, so as to achieve correct reception of messages sent by the local switching exchange, and avoid damage to the telephone terminal detection circuits.

DESCRIPTION OF THE INVENTION

To overcome the problems mentioned above, the method and system for transmitting messages to subscribers during the set-up stage of incoming telephone calls, object of the present invention, are proposed.

The present invention describes in particular the method and system to be employed in an access system with shared resources in order to provision the on-hook data transmission service when the connection with the switching exchange is established through said access system via a two-wire telephone line.

According to the method of the invention, an access system situated between a local exchange and at least one telephone terminal simulates, on one side, the operation of a telephone terminal towards the local switching exchange such that it receives and stores at least a first message sent from said local switching exchange; and, on the other side, it simulates the operation of a local switching exchange towards the telephone terminal such that it generates and transmits to said telephone terminal a second message which is a replication of said first message.

Preferentially, the first message sent from the local exchange is modulated, being demodulated in order to be stored in the access system for its later replication.

Likewise, the access system as proposed in the present invention comprises means for receiving and storing at least one first message proceeding from a local switching exchange and means for generating a second message which is a replication of said first message and forward it to a destination telephone terminal.

In the event that the first message received is modulated, the access system of the invention preferentially comprises means for demodulating said first modulated message in order to be stored in the access system for its later replication.

In this way, the problems of delays or lack of synchronisation that could be caused by the transfer of messages through an access system are overcome.

Other objects of the present invention are described in the subclaims and in the description that is to be found hereafter, with the support of the accompanying drawings.

DESCRIPTION OF THE PREFERRED EMBODIMENTS

Figure 2:
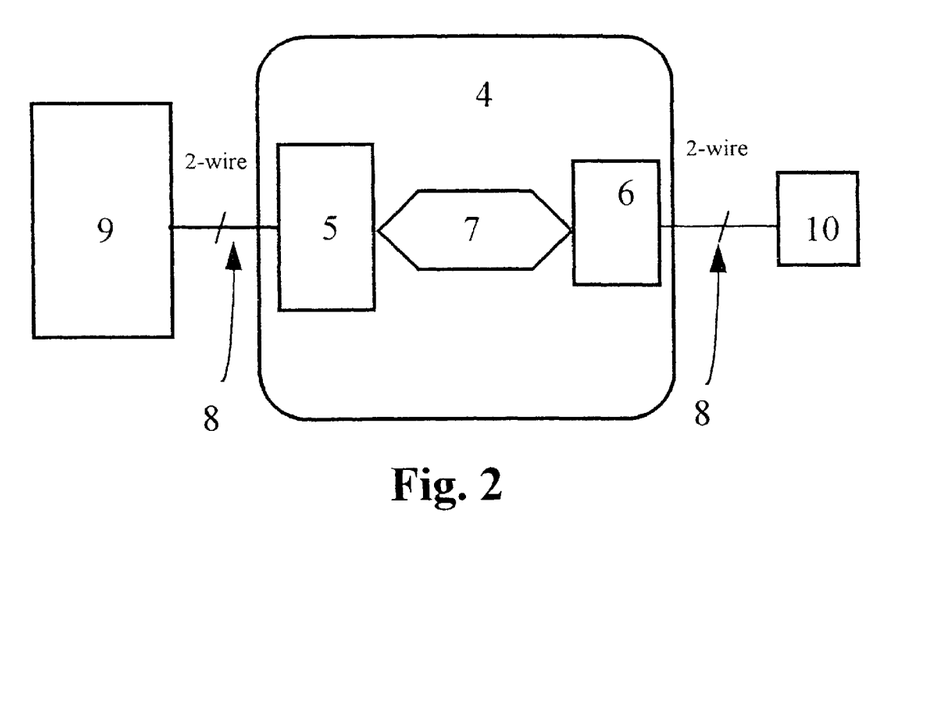
FIG. 2 shows a two-wire access system architecture.

As can be seen from FIG. 2, a central access system architecture (4) mainly comprises a central access node (5) which is connected to a set of network terminations (6) by whatever appropriate transmission means (7) like, for example, radio, optic fibre, cable or similar media.

Also, the access node (5) is connected by a two-wire telephone line (8) to the local switching exchange (9); and each network termination (6) is connected by a two-wire telephone line (8) to one or more telephone terminal(s) (10).

The central access node (5) is able of receiving the modulated messages transmitted by the local switching exchange (9) as well as the signalling sent by it, for replicating them towards the telephone terminal once the resources have been allocated.

Figure 7:
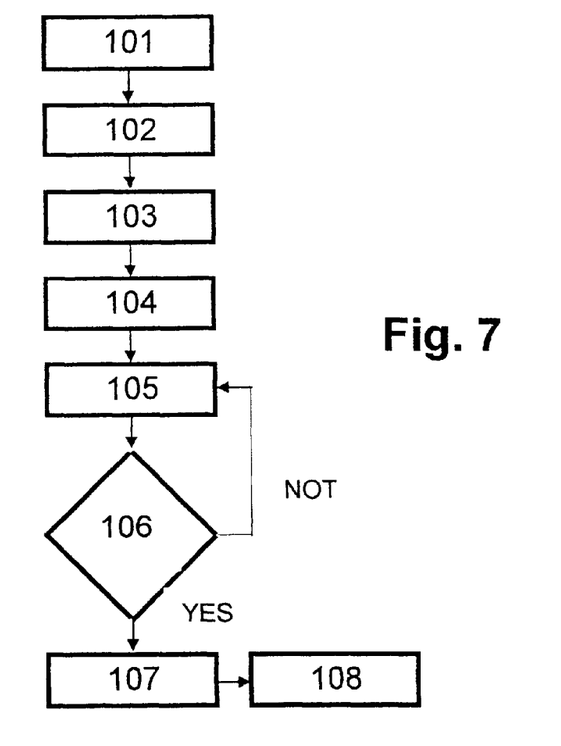
FIG. 7 is a flow chart of the message replicating process in the central access node.

With this arrangement, and also making reference to FIG. 7, a description is provided hereunder of the steps that constitutes the method of the invention:

I. In step (101), it is observed that the local switching exchange (9) can sends an alert signal to the central access node (5). The latter connects its message detection circuitry, i.e. the demodulator, for receiving the next message, which is modulated, intended for the associated telephone terminal (10).

II. In step (102), it is observed that the central access node (5) starts the internal resources allocation procedures for the network termination (6) to which is connected the telephone terminal (10) for which the message and the call are intended.

III. Once the local switching exchange (9) transmits the modulated message, in step (103), the demodulation circuitry in the central access node (5) will demodulate the message, storing it in memory until it has to be sent to the telephone terminal (10).

IV. In accordance with step (104), after receiving the indication that the resources between the central access node (5) and the network termination (6) have been assigned, the network termination (6) shall be instructed to start the generation of an alert signal towards the telephone terminal (10), requesting at the same time that an acknowledgement message be sent from the network termination (6) to the central access node (5), once the alert signal has been replicated, as is shown in step (105).

V. If said alert signal is replicated by the network termination (6) towards the telephone terminal (10), step (106), the procedure progresses into step (107) or (107') which shall be described later. If this is not the case, steps (105) and (106) are repeated as often as is required until the network termination (6) indicates, by means of an acknowledgement message, the transmission of the alert signal to the telephone terminal (10).

VI. The telephone terminal (10), on receiving the alert signal, connects its message detection circuitry (demodulator) in the conventional manner.

VII. Thereafter, there are two possible alternative ways of sending the modulated message to the telephone terminal.

The difference between the two alternative ways lies in the replication of said message to be sent to the telephone terminal being carried out either in the central access node (5) or in the network termination (6).

Figure 3:
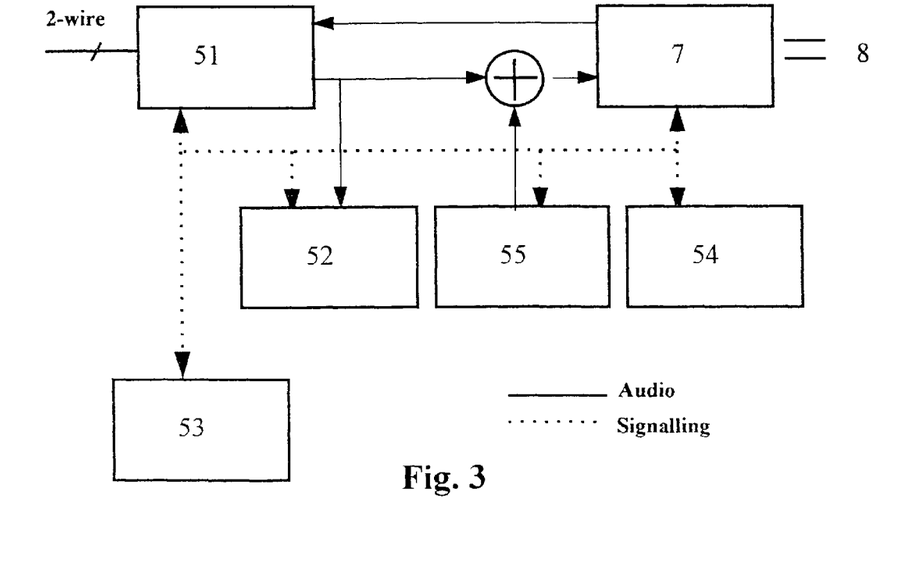
FIG. 3 shows a block diagram of a central access node according to one embodiment of the invention.
Figure 4:
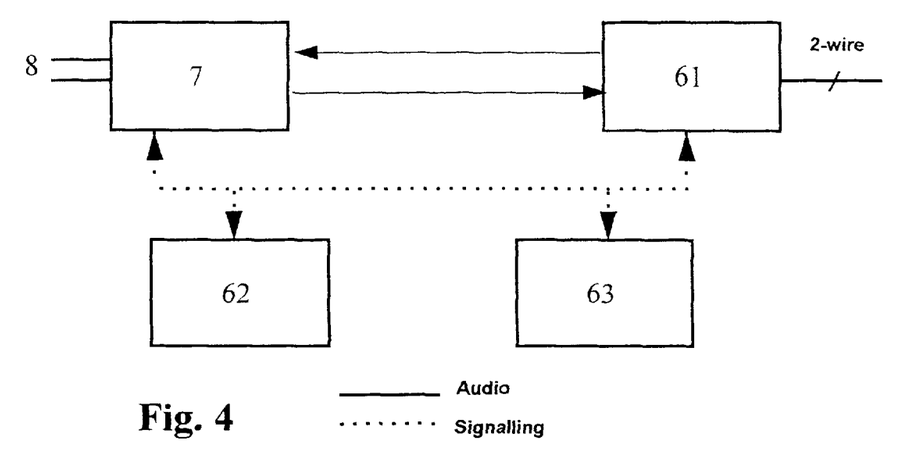
FIG. 4 shows a block diagram of a network termination to be used with the central access node of FIG. 3.

According to a first embodiment of the invention, and making reference to FIGS. 3 and 4, the central access node (5) basically comprises:

- a two-wire telephone interface circuit (51) towards the local switching exchange, able of translating the telephone signalling into the access system control signalling and enabling the transfer of the signals in the audio frequency band between the local switching exchange and the telephone terminal;
- an alert signal detection circuit included in the telephone interface circuit (51);
- a received message demodulating circuit, or demodulator, (52);
- a microprocessor (53) serving for managing the whole operation as well as for storing/extracting the demodulated message in/from a memory device (54);
- a memory device (54) for storing the program that permits the operation of the access system (4), as well as for storing the messages received from the local switching exchange; and
- a message modulation circuit, or modulator, (55) serving for replicating the message in the audio frequency band towards the telephone terminal.

For its part the network termination (6) basically comprises:

- a two-wire telephone interface circuit (61) towards the telephone terminal, able of translating the telephone signalling into the access system control signalling and enabling the transfer of the signals in the audio frequency band between the local switching exchange and the telephone terminal,
- an alert signal generation circuit included in the telephone interface circuit (61);
- a microprocessor (62) serving for managing the whole operation from the commands received from the central access node (5); and
- a memory device (63) for storing the program that permits the operation of the network termination.

According to this first embodiment, and also with reference to FIG. 7, the access node (5), in step (107), from the message received from the local switching exchange (9) and demodulated in the demodulator (52) and stored in its memory (54), produces the same message but modulated in the audio frequency band by the modulator (55), transmitting it over a channel allocated in the transmission means (7) to the network termination (6), the latter permitting the modulated message to pass transparently to the telephone terminal (10).

Figure 5:
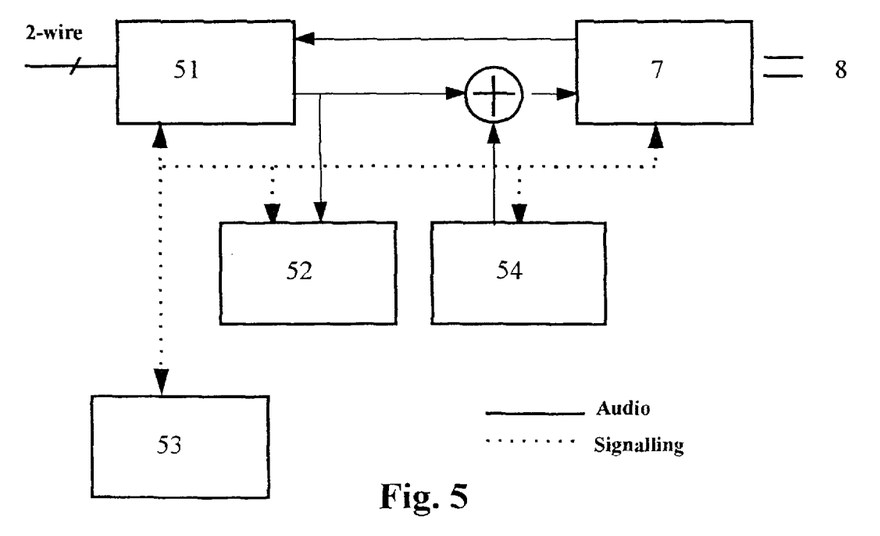
FIG. 5 shows a block diagram of a central access node according to an alternative embodiment of the invention.
Figure 6:
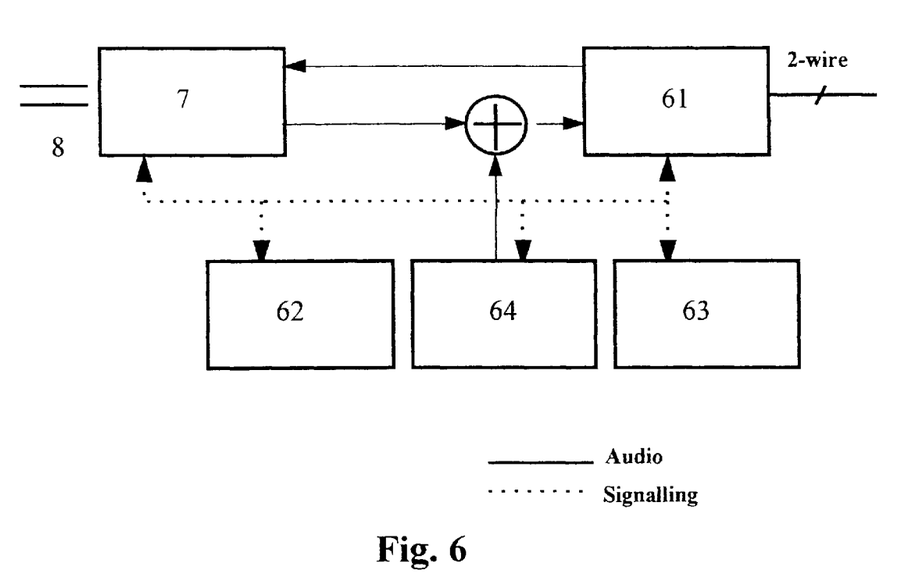
FIG. 6 shows a block diagram of a network termination to be used with the central access node of FIG. 5.

According to an alternative embodiment of the invention, and making reference to FIGS. 5 and 6 in which to like parts like reference numbers have been assigned, the central access node (5) basically comprises:

- a two-wire telephone interface circuit (51) for the local switching exchange, able of translating the telephone signalling into the control signalling of the access system (4) and enabling the transfer of the signals in the audio frequency band between the local switching exchange and the telephone terminal;
- an alert signal detection circuit included in the telephone interface circuit (51);
- a received message demodulating circuit, or demodulator, (52);
- a microprocessor (53) serving for managing the whole operation as well as for storing/extracting the demodulated message in/from a memory device (54); and
- a memory device (54) for storing the program that permits the operation of the access system (4), as well as for storing the messages received from the local switching exchange.

For its part the network termination (6) basically comprises:

- a two-wire telephone interface circuit (61) for the telephone terminal, able of translating the telephone signalling into the control signalling of the access system (4) and enabling the transfer of the signals in the audio frequency band between the local switching exchange and the telephone terminal;
- an alert signal generation circuit included in the telephone interface circuit (61);
- a microprocessor (62) serving for managing the whole operation from the commands received from the central access node (5);
- a message modulation circuit, or modulator, (64) serving for replicating the message received through signalling from the central access node in the audio frequency band and for sending it to the telephone terminal (10); and
- a memory device (63) in which the program that controls the operation of the network termination (6) is stored.

Figure 8:
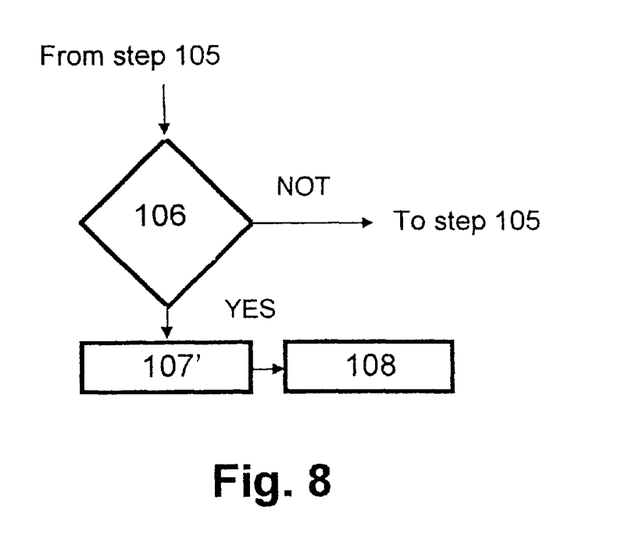
FIG. 8 is a partial illustration of an alternative form of implementing the message replicating process of FIG. 7.

According to this alternative embodiment of the invention, and also with reference to FIG. 8, the central access node (5) sends to the network termination (6) a message, which has been demodulated in its demodulator (52) through the own signalling of the access system (4), containing the message to be replicated towards the telephone terminal (10), as can be seen in step (107'). In this case, it is the network termination (6) that contains the necessary circuitry, i.e. the modulator (64), for generating the message modulated in the audio frequency band from the message received from the central access node (5).

VIII. Once a period of time has elapsed, defined according to the previously mentioned standard, as the guard time required after sending a message, in either of the alternative embodiments explained above, the central access node (5) will send to the network termination (6) a signal for initiating the signalling tone pulse towards the telephone terminal (10), considering said ringing current to be available still in the local switching exchange (9), triggering thereby the start of an audible warning in the telephone terminal (10) for the purpose of displaying to the user the message received from the local switching exchange (9). This process corresponds to step (108) that occurs either after step (107) of FIG. 7, or step (107') of FIG. 8.

IX. From this moment, the call progresses in the manner conventionally accepted.

What is claimed is:

1. A method for transmitting messages to subscribers to a telephone network during a set-up stage of incoming calls prior to the off-hook from a local exchange (9) to at least one telephone terminal (10) through an access system (4), wherein said access system (4) simulates, on one side, the operation of a telephone terminal towards the local switching exchange (9) such that it receives and stores at least a first message sent from said local switching exchange (9); and, on the other side, it simulates the operation of a local switching exchange towards the telephone terminal (10) such that it generates and sends to said telephone terminal (10) a second message which is a replication of said first message, wherein the access system (4) communicates with the local switching exchange (9) and with one or more associated telephone terminals (10) over respective two-wire telephone lines (8), and the first message sent from the local switching exchange (9) is modulated, being demodulated in order to be stored in the access system (4) for later replication, the simulation on the part of the access system (4) of the operation of a telephone terminal towards the local switching exchange (9) comprising the steps of:

sending an alert signal from the local switching exchange (9) to a central access node (5) located in the access system (4);

activating in the central access node (5) message detection means for receiving at least one message intended for the associated telephone terminal (10);

allocating resources by the central access node (5) towards a network termination means (6) located in the access system (4) and to which is connected the telephone terminal (10) for which the message is intended;

receiving in the central access node (5) a first modulated message coming from the local switching exchange (9); and demodulating in the central access node (5) each first modulated message so received, and storing it in a memory (54) for its later forwarding to the telephone terminal (10).

2. A method according to claim 1, wherein the simulation on the part of the access system (4) of the operation of a local switching exchange (9) towards the telephone terminal (10) comprises the steps of:

ordering the network termination means (6) from the central access node (5) to start the generation and sending of an alert signal to the telephone terminal (10), requesting simultaneously the sending of an indication signal from the network termination (6) to the central access node (5) once the alert signal has been transmitted;

activating in the telephone terminal (10), on receiving the alert signal, the modulated message detection means; and producing at least one second modulated message in the access system (4) that is a replication of said first modulated message, and sending it to said telephone terminal (10).

3. A method according to claim 2, wherein each second modulated message to be sent to the telephone terminal (10) is generated in the access node (5) from a first message demodulated and stored in its memory (54) that is modulated in an audio frequency band, and is sent over a channel allocated to the network termination means (6), which permits the transfer of said second modulated message in a transparent manner to the telephone terminal (10).

4. A method according to claim 2, wherein each second modulated message to be sent to the telephone terminal (10) is generated in the network termination means (6) from a demodulated message received from the central access node (5) whereby a modulated message is produced, in an audio frequency band, in order to be sent to the telephone terminal (10).

5. A method according to claim 3, wherein once elapsed a guard time after the sending of the message, the central access node (5) sends to the network termination means (6) a signal for starting the transmission of the ringing tone pulses towards the telephone terminal (10) for producing an acoustic warning in the telephone terminal (10) for the purpose of displaying to the user the message received from the local switching exchange (9).

6. An access system for carrying out the, method of claim 1, wherein said access system comprises means (5) for receiving and storing at least one first message coming from a local switching exchange (9) and means (5, 6) for generating a second message which is a replication of said first message and sending it to a destination telephone terminal (10).

7. A system according to claim 6, wherein said first message is modulated, and the access system (4) comprises means (52) for demodulating said first modulated message in order to store it in the access system for its later replication.

8. A system according to claim 7, wherein the access system (4) comprises at least one central access node (5) connected via at least first transmission means (7) to at least one network termination means (6), each central access node (5) being connected to a local switching exchange (9) via second transmission means, and each network termination means (6) being connected to at least one telephone terminal (10) via third transmission means, the central access node (5) serving for receiving, demodulating and storing the modulated messages sent by the local switching exchange (9) as well as signaling sent by it, and the network termination means (6) serving for transmitting the replicated messages towards the telephone terminal (10).

9. A system according to claim 8, wherein the second transmission means and the third transmission means are two-wire telephone lines (8).

10. A system according to claim 9, wherein the central access node (5) comprises:

two-wire telephone interface means (51) towards the local switching exchange (9), capable of translating telephone signaling into control signaling of the access system (4) and enabling the transfer of signals in an audio frequency band between the local switching exchange (9) and the telephone terminal (10);

detection means for detecting an alert signal, sent from the local switching exchange (9), said detection means being included in the interface means (51);

means for demodulating (52) a received message;

a microprocessor (53) serving for managing the whole operation as well as for storing a demodulated message in storage means (54) and extracting a demodulated message from storage means (54) and producing instructions for the network termination means;

storage means (54) for storing a program that permits the operation of the access system (4), as well as for storing the messages received from the local switching exchange (9); and message modulation means (55) for replicating a message in the audio frequency band towards the telephone terminal (10).

11. A system according to claim 10, wherein the network termination means (6) comprises:

two-wire telephone interface means (61) towards the telephone terminal (10), capable of translating the telephone signaling into the control signaling of the access system (4) and enabling the transfer of the signals in the audio frequency band between the local switching exchange and the telephone terminal (10);

alert signal generation means for sending an alert signal to the telephone terminal (10), said alert signal generation means being included in the interface means (61);

a microprocessor (62) serving for managing the whole operation from commands received from the central access node (5) and interchanged with the telephone terminal (10); and storage means (63) for storing the program that permits the operation of the network termination means.

12. A system according to claim 9, wherein the central access node (5) comprises:

two-wire telephone interface means (51) towards the local switching exchange (9), capable of translating telephone signaling into control signaling for the access system (4) and enabling the transfer of signals in an audio frequency band between the local switching exchange (9) and the telephone terminal (10);

detection means for detecting an alert signal sent from the local switching exchange (9), said detection means being included in the interface means (51);

means for demodulating a received message (52);

a microprocessor (53) serving for managing the whole operation as well as for storing a demodulated message in storage means (54) and extracting a demodulated message from storage means (54) and producing instructions for the network termination means; and storage means (54) for storing a program that permits the operation of the access system (4), as well as for storing the messages received from the local switching exchange (9).

13. A system according to claim 12, wherein the network termination means (6) comprises:

two-wire telephone interface means (61) towards the telephone terminal (10), capable of translating the telephone signaling into the control signaling of the access system (4) and enabling the transfer of the signals in the audio frequency band between the local switching exchange and the telephone terminal (10);

alert signal generation means for generating an alert signal to be sent to the telephone terminal (10), said alert signal generation means being included in the interface means (61);

a microprocessor (62) serving for managing the whole operation from commands received from the central access node (5) and interchanged with the telephone terminal (10);

storage means (63) for storing the program that permits the operation of the network termination means (6); and message modulating means (64) for replicating a message received from the central access node (5) and sending it in the audio frequency band towards the telephone terminal (10).

* * * * *